(12) United States Patent
Matsunaga

(10) Patent No.: US 6,504,855 B1
(45) Date of Patent: Jan. 7, 2003

(54) DATA MULTIPLEXER AND DATA MULTIPLEXING METHOD

(75) Inventor: Osamu Matsunaga, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/208,289

(22) Filed: Dec. 8, 1998

(30) Foreign Application Priority Data

Dec. 10, 1997 (JP) .............................................. 9-340414

(51) Int. Cl.[7] .................................................. H04J 3/04

(52) U.S. Cl. ........................................ 370/537; 370/242

(58) Field of Search ................................. 370/229, 230, 370/235, 252, 253, 535, 537, 538, 540, 216, 241, 242, 243, 244, 245, 248; 714/746, 799

(56) References Cited

U.S. PATENT DOCUMENTS

| | | | | |
|---|---|---|---|---|
| 5,657,325 A | * | 8/1997 | Lou et al. | 370/334 |
| 5,710,756 A | * | 1/1998 | Pasternak et al. | 370/216 |
| 5,761,209 A | * | 6/1998 | Murakami | 370/536 |
| 5,801,781 A | * | 9/1998 | Hiroshima et al. | 348/441 |
| 5,878,045 A | * | 3/1999 | Timbs | 370/328 |
| 6,185,526 B1 | * | 2/2001 | Kato et al. | 704/227 |

* cited by examiner

Primary Examiner—Ricky Ngo
(74) Attorney, Agent, or Firm—Frommer Lawrence & Haug LLP; William S. Frommer; Gordon Kessler

(57) ABSTRACT

In a data multiplexer for multiplexing and outputting data streams of plural channels, multiplexing efficiency can be improved by effectively using a data transmission rate of a transmission system. Invalid data assigned to an inputted data stream is detected and extracted and moreover, a data stream from which the invalid data is extracted is multiplexed and outputted, so that multiplexing efficiency for valid data can be improved.

12 Claims, 8 Drawing Sheets

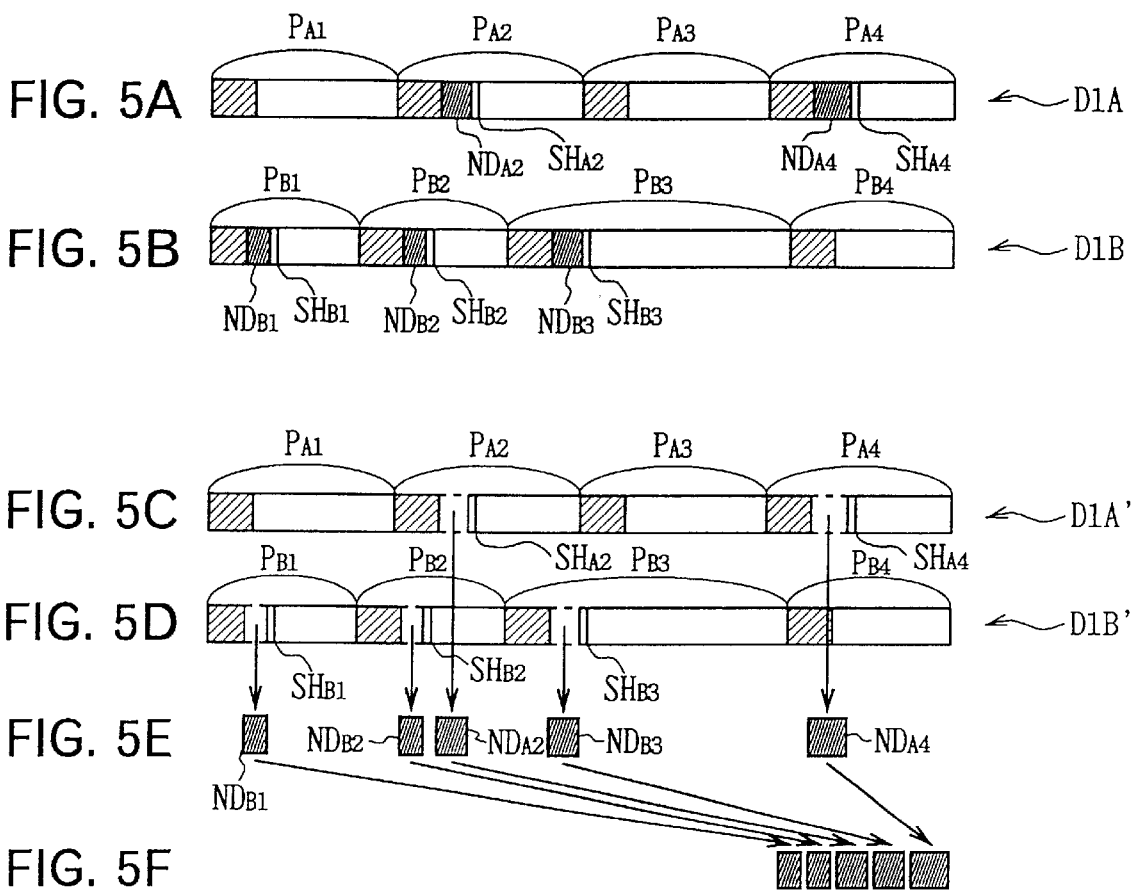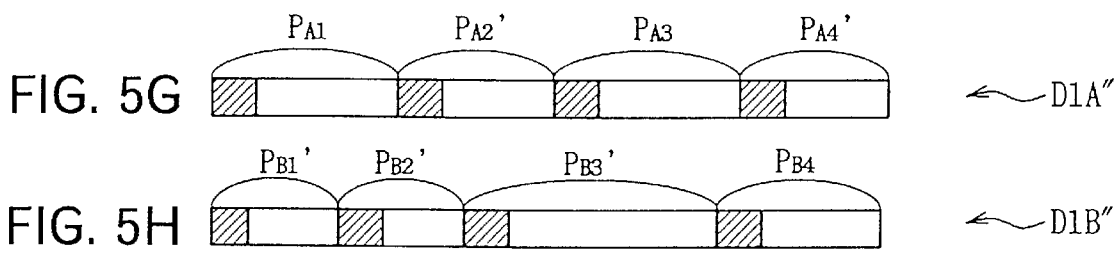

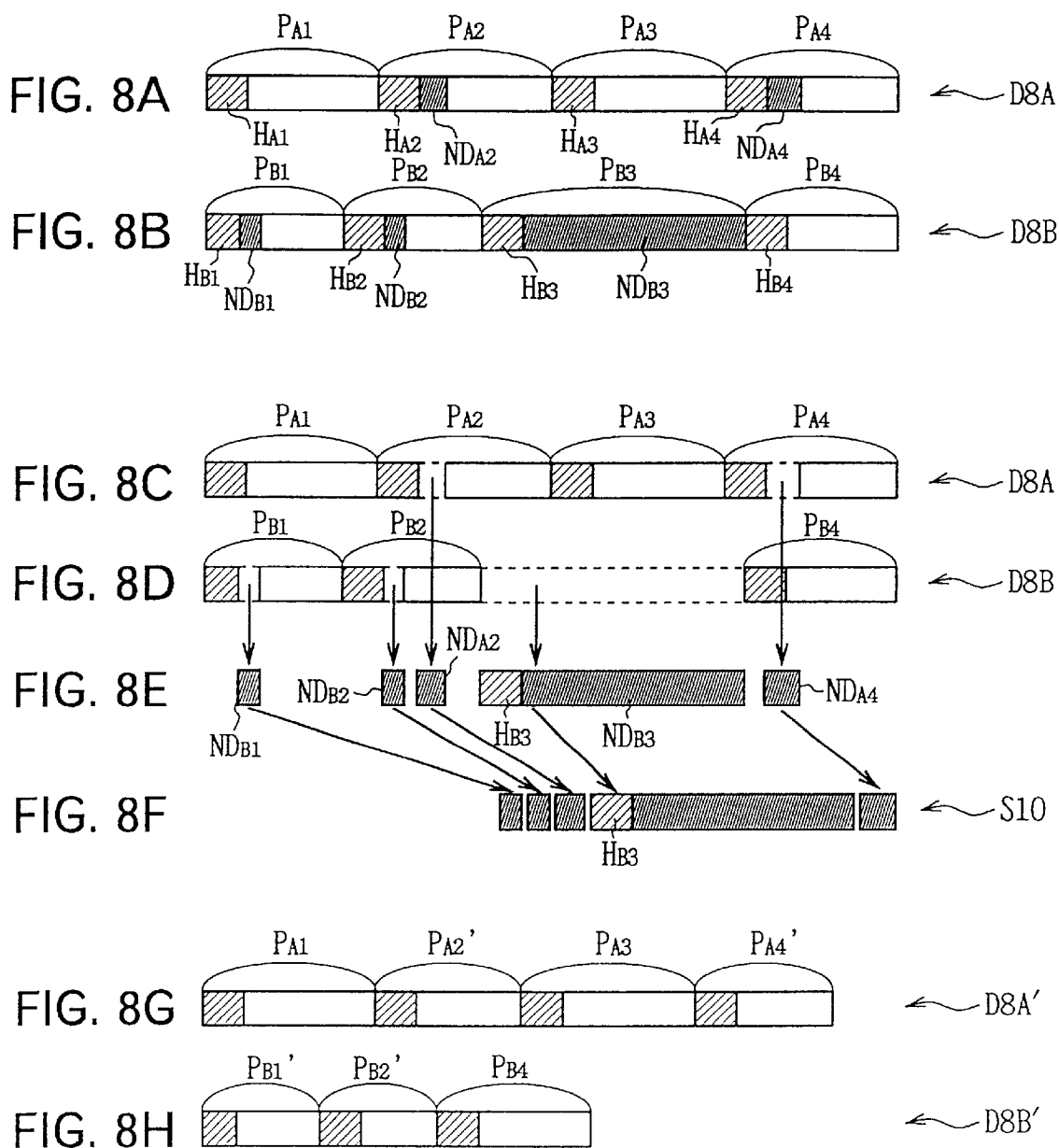

DATA MULTIPLEXER AND DATA MULTIPLEXING METHOD

BACKGROUND OF THE INVENTION

1. Field of the Invention

The present invention relates to a data multiplexer and a multiplexing method and more particularly, is suitably applied to a data multiplexer of a digital broadcasting system.

2. Description of the Related Art

Various compression-encoding methods are recently proposed as methods of reducing the information quantity of pictures and sounds and Moving Picture Experts Group Phase 2 (MPEG2) is the typical one of the compression-encoding methods.

The MPEG2 method is standardized (e.g. Recommendation H.222.0) by an organization such as International Telecommunication Union-Telecommunication Standardization Sector (ITU-T) and specified in order to compression-encode, multiplex and transmit picture data and sound data.

Actually, the MPEG2 method specifies a data format referred to as a program stream (hereafter, referred to as a PS data format) and a data format referred to as a transport stream (hereafter, referred to as a TS data format) as data formats for multiplexing compression-encoded picture data and sound data.

The PS data format is used to accumulate multiplexed picture data and sound data in a predetermined digital accumulation medium, and the TS data format is used to transmit multiplexed picture data and sound data. Moreover, streams having the PS data format and TS data format can be mutually converted with a variable-length Packetized Elementary Stream (PES) packet as a basic element.

In the case of the PS data format, for example, it is specified that compression-encoded picture data and sound data are respectively formed into a PES packet every predetermined unit (e.g. every picture), to form a PS packet string (so-called, a program stream) by time-dividing and multiplexing each of the resultant PES packets.

FIG. 1 shows a transmitter 100 of a digital broadcasting system. The transmitter 100 supplies picture data D1A and D1B corresponding to respective television broadcast programs to corresponding encoders 101A and 101B from data output sections (not illustrated) corresponding to plural channels, compression-encodes the picture data D1A and D1B in accordance with the MPEG2 method in the corresponding encoders 101A and 101B, and successively forms encoded data thus obtained into a PES packet every picture, in order to form and supply encoded data streams D31A and D31B to a multiplexer 102.

To multiplex the encoded data streams D31A and D31B supplied from the respective encoders 101A and 101B, the multiplexer 102 stores and temporarily accumulates plural PES packets included in the encoded data streams D31A and D31B in corresponding buffers 103A and 103B in arriving order and then, reads out and transmits the PES packets from the buffers to a multiplexing section 104 in accordance with the first-in first-out method.

In this case, the buffers 103A and 103B respectively supply the amount of data accumulated in the PES packets to a multiplexing control section 105 as data accumulation signals S2A and S2B and thereby, the multiplexing control section 105 respectively detects the amount of data accumulated in the buffers 103A and 103B, based on the data accumulation signals S2A and S2B.

The multiplexing control section 105 transmits buffer output control signals S3A and S3B to the respective buffers 103A and 103B based on the detection result before the amount of data exceed the maximum data accumulation capacities of the buffers 103A and 103B. Thereby, the section 105 can read out the PES packets from the buffers 103A and 103B in accordance with the first-in first-out method and thus, it is possible to prevent the buffers 103A and 103B from being broken down due to excessive data accumulation.

Then, the multiplexing section 104 receives the encoded data streams D31A and D31B from the respective buffers 103A and 103B and moreover, receives a multiplexing control signal S4 from the multiplexing control section 105 and then, successively forms plural PES packets included in the respective encoded data streams D31A and D31B into a packet (hereafter, referred to as transport stream "TS" packet) every predetermined unit (e.g. every 188-byte data) and thereafter, forms a transport stream (TS stream) comprising one TS packet string D32 by time-dividing and multiplexing the resultant TS packets.

Then, the TS stream D32 is modulated by a not-illustrated modulator in accordance with a predetermined method and the resultant transmission signal is transmitted toward a broadcasting satellite (not illustrated) through an antenna. In this way, the transmitter 100 can broadcast television programs for plural channels through the broadcasting satellite.

In the case of the transmitter 100, the encoders 101A and 101B supply the respective compression-encoded picture data (encoded data streams D31A and D31B) to a multiplexer at a fixed bit rate. In this case, when patterns of input picture data D1A and D1B are flat, the amount of encoded data successively generated by the encoders 101A and 101B are reduced due to the fact that the amount of picture information of the picture data D1A and D1B are extremely small.

Therefore, when the encoders 101A and 101B form successively generated encoded data into a PES packet every picture, they keep the transmission rates of the encoded data streams D31A and D31B comprising the PES packet strings constant by adding dummy data originally unnecessary for encoding (hereafter, referred to as invalid data) to valid data in bytes.

The transmission rates of significant information in the encoded data streams D31A and D31B have a problem of being reduced by a value equivalent to added invalid data because the encoders 101A and 101B respectively output encoded data streams D31A and D31B to which invalid data is added.

SUMMARY OF THE INVENTION

In view of the foregoing, an object of this invention is to provide a data multiplexer in which multiplexing efficiency can be improved by effectively using the data transmission rate of a transmission system.

The foregoing object and other objects of the invention have been achieved by the provision of a data multiplexer which detects and extracts invalid data assigned to an inputted data stream and multiplexes and outputs the data stream from which the invalid data is extracted. Thereby, it is possible to improve multiplexing efficiency for invalid data.

Moreover, by detecting the amount of extracted invalid data and multiplexing a predetermined data stream onto the data stream from which invalid data is extracted in accordance with the amount of detected invalid data, it is possible to improve multiplexing efficiency by a value equivalent to the multiplexed predetermined data stream instead of the invalid data.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 5A to 5H are schematic diagrams explaining the process of extracting invalid data;

FIGS. 8A to 8H are schematic diagrams explaining the processing of extracting invalid data according to other embodiments.

DETAILED DESCRIPTION OF THE EMBODIMENT

Preferred embodiments of this invention will be described with reference to the accompanying drawings:

(1) First Embodiment

Figure 1:
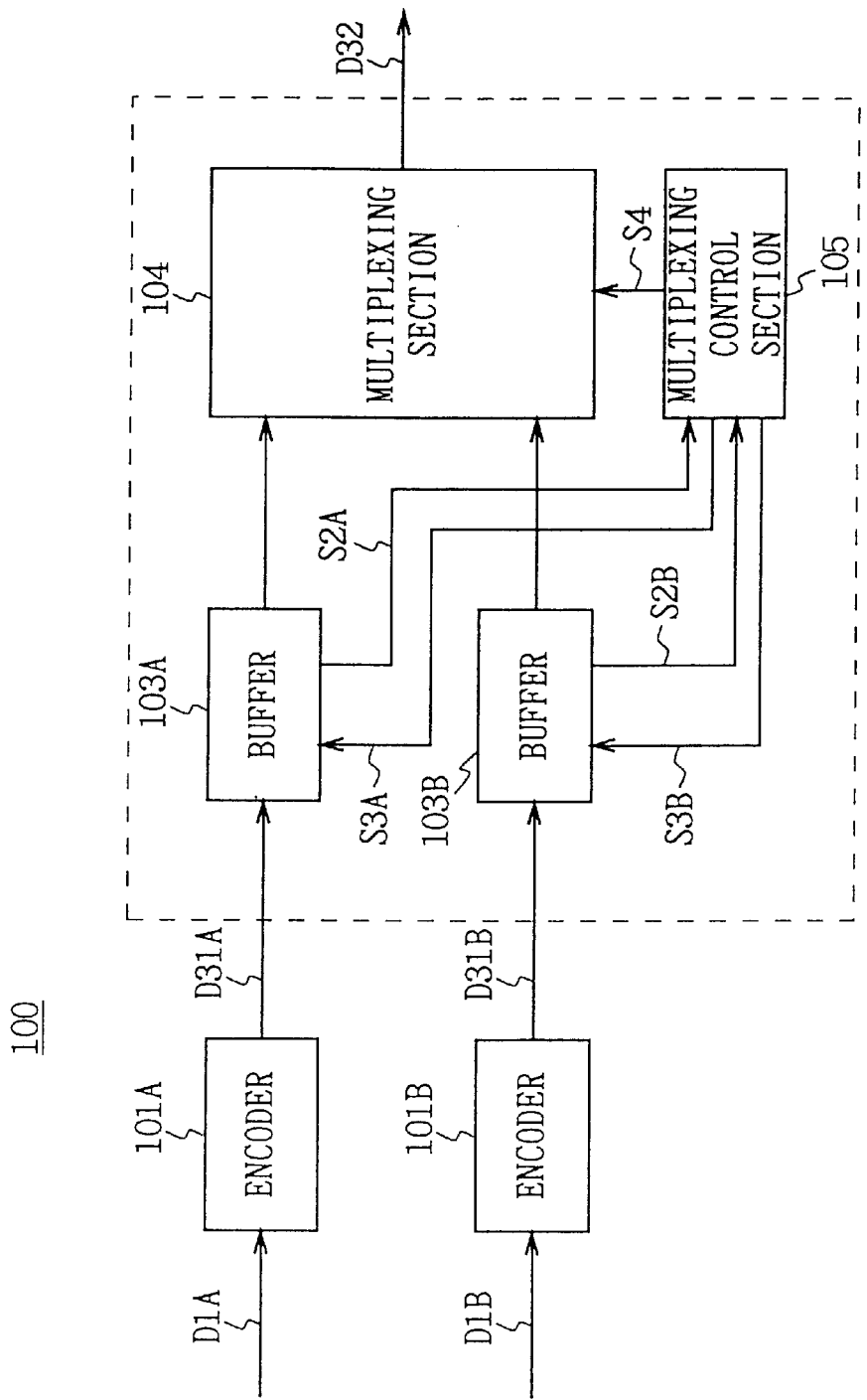
FIG. 1 is a block diagram showing a transmitter relating to the present invention.
Figure 2:
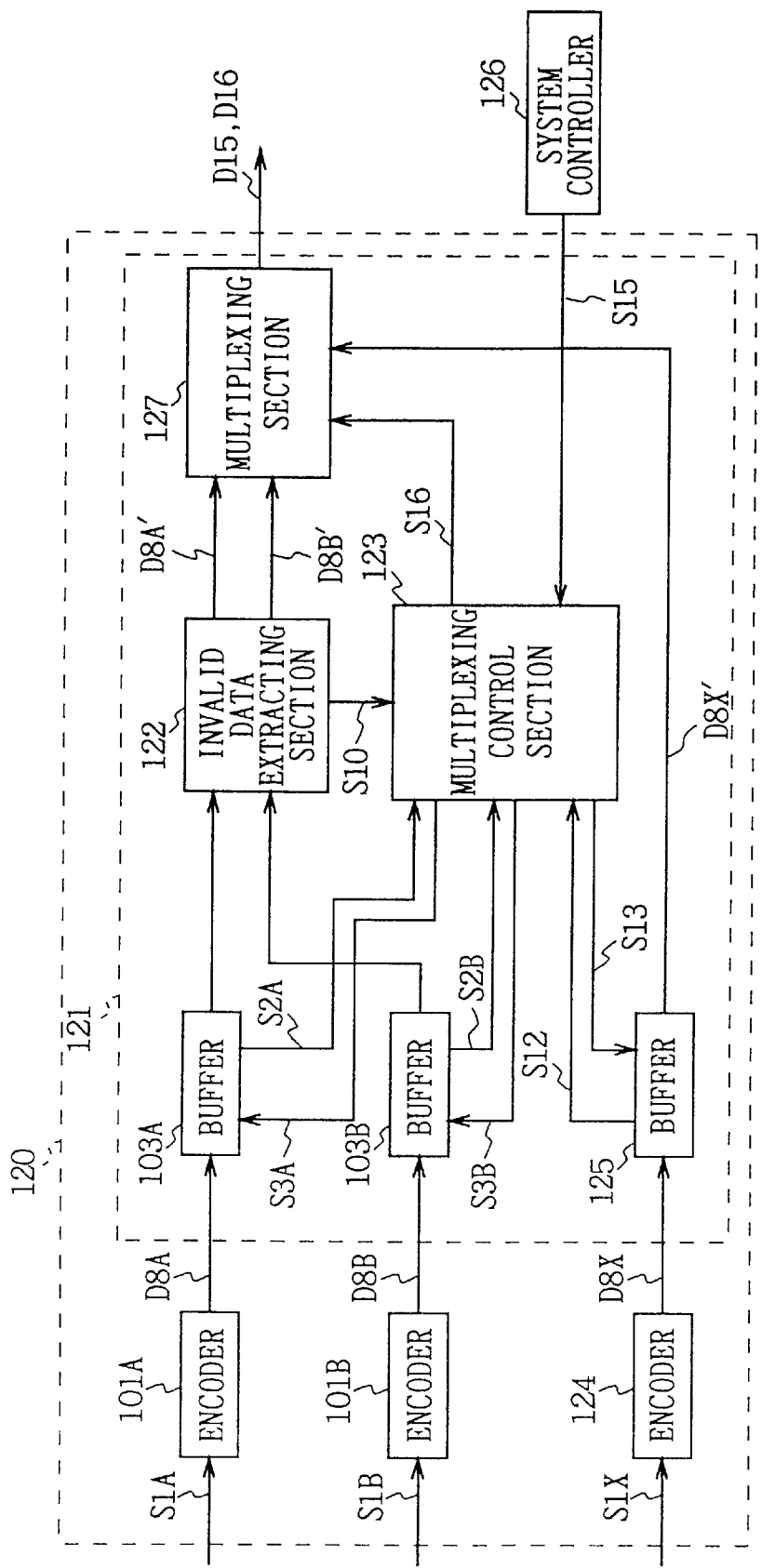
FIG. 2 is a block diagram showing the first embodiment of a multiplexer according to the present invention.

In FIG. 2 where the same reference numerals are applied to parts corresponding to FIG. 1, numeral 120 denotes a transmitter of a digital broadcasting system according to the first embodiment, to which the present invention is applied as a whole. In the transmitter 120, picture data D1A and D1B constituting television broadcast programs are respectively supplied to encoders 101A and 101B from data output sections (not illustrated) corresponding to plural of channels.

Figure 3:
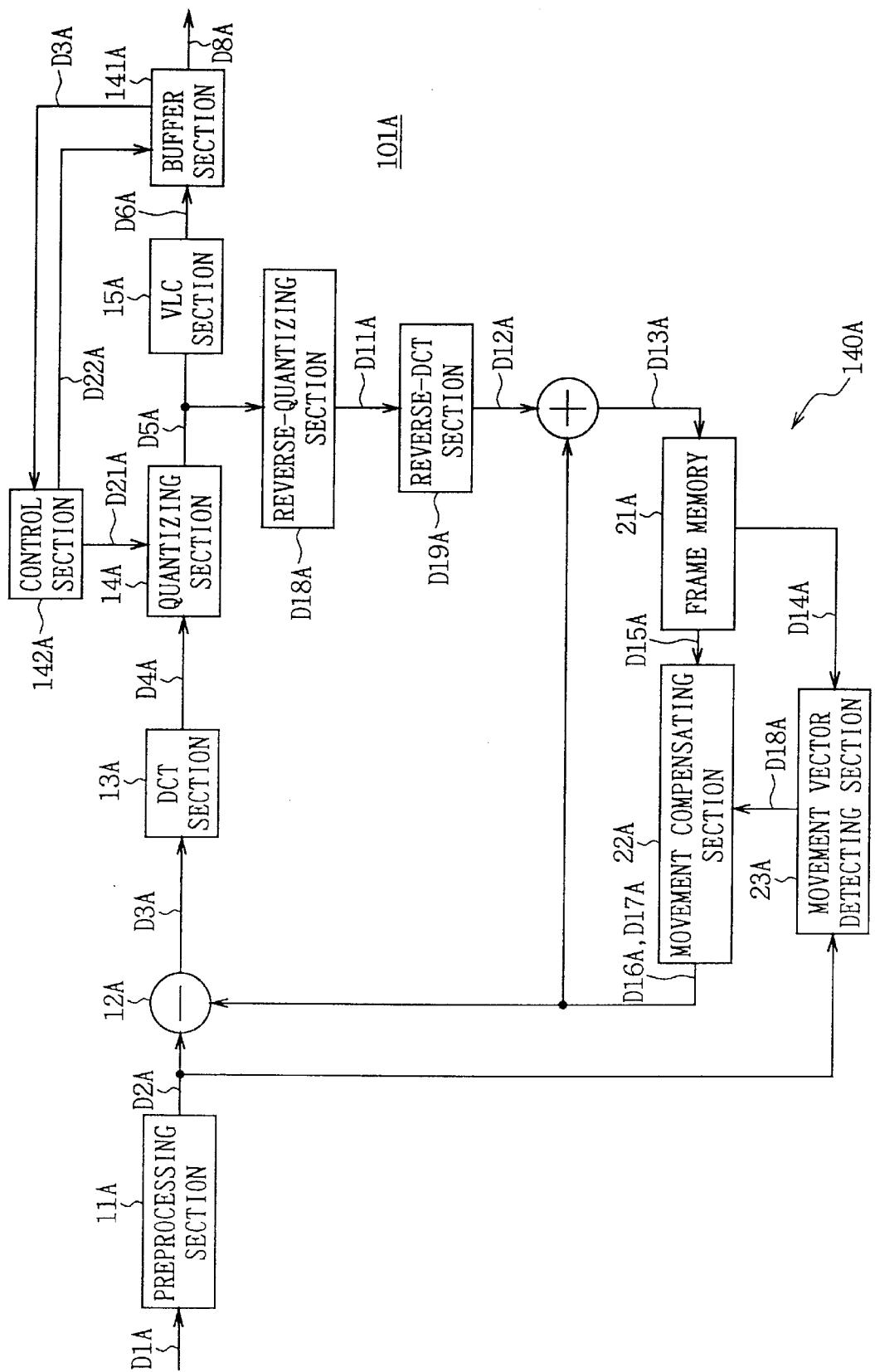
FIG. 3 is a block diagram showing the structure of an encoder in the first embodiment.

In this case, the encoders 101A and 101B have the same structure. The encoder 101A inputs the picture data D1A to a preprocessing section 11A as shown in FIG. 3. The preprocessing section 11A designates as which type each frame picture of successively inputted picture data D1A should be processed among three picture types of I-picture, P-picture, and B-picture and then, rearranges the frame pictures in order of encoding in accordance with the picture type of the frame pictures, divides the frame pictures into macroblocks respectively constituted with a luminance signal of 16 pixels×16 lines and a color difference signal corresponding to the luminance signal, and supplies the macroblocks to an arithmetic circuit 12A and a movement vector detecting section 23A as macroblock data D2A.

The movement vector detecting section 23A computes the movement vector of each macroblock of the macroblock data D2A in accordance with the macroblock data D2A and reference picture data D14A stored in a frame memory 21A and transmits the computed movement vector to a movement compensating section 22A as movement vector data D18A.

The arithmetic circuit 12A applies any movement compensation of the intramode, forward estimation mode, backward estimation mode, and bidirectional estimation mode to the macroblock data D2A supplied from the preprocessing section 11A in accordance with the picture type of each macroblock of the macroblock data D2A. In this case, the intramode is a method of using a frame picture to be encoded directly as transmission data, and the forward estimation mode is a method of using the estimation residue between a frame picture to be encoded and a past reference picture as transmission data. The backward estimation mode is a method of using the estimation residue between a frame picture to be encoded and a-future reference picture as transmission data, and the bidirectional estimation mode is a method of using the estimation residue between a frame picture to be encoded and the average value of a past reference picture and a future reference picture as transmission data.

First, the case is described in which the macroblock data D2A is an I-picture. In this case, the macroblock data D2A is processed in the intramode. That is, the arithmetic circuit 12A directly transmits the macroblock of the macroblock data D2A to a discrete cosine transform (DCT) section 13A as arithmetic data D3A. The DCT section 13A applies the DCT processing to the arithmetic data D3A to transform the data D3A into a DCT coefficient and transmits the DCT coefficient to a quantizing section 14A as DCT coefficient data D4A. The quantizing section 14A applies quantization processing to the DCT coefficient data D4A and transmits it to a VLC section 15A and a reverse-quantizing section 18A as quantized DCT coefficient data D5A. In this case, the quantizing section 14A adjusts a quantization step size in the quantization processing in accordance with a quantization control value D21A supplied from a control section 142A in order to control the number of codes to be generated.

The quantized DCT coefficient data D5A transmitted to the reverse-quantizing section 18A undergoes the reverse-quantization processing to be transmitted to a reverse-DCT section 19A as DCT coefficient data D11A. Then, the DCT coefficient data D11A undergoes the reverse-DCT processing in the reverse-DCT section 19A to be transmitted to an arithmetic circuit 20A as arithmetic data D12A and stored in the frame memory 21A as reference picture data D13A.

Then, the case is described in which the macroblock data D2A is a P-picture. In this case, the arithmetic circuit 12A applies the movement compensation processing based on either the intramode or forward estimation mode, to the macroblock data D2A.

In the case where the intramode is used as the estimation mode, the arithmetic circuit 12A directly transmits the macroblock of the macroblock data D2A to the DCT section 13A as the arithmetic signal D3A as the same as the case of the above I-picture.

In the case where the forward estimation mode is used as an estimation mode, however, the arithmetic circuit 12A applies a subtraction processing to the macroblock data D2A by using forward-estimation picture data D17A supplied from the movement compensating section 22A.

The forward-estimation picture data D17A is computed by movement-compensating the reference picture data D13A, which is stored in the frame memory 21A, in accordance with the movement vector data D18A. That is, the movement compensating section 22 reads out the reference picture data D13A in the forward estimation mode by shifting the read address of the frame memory 21A in accordance with the movement vector data D18A and supplies the data D13A to the arithmetic circuits 12A and 20A as the forward-estimation picture data D17A. The arithmetic circuit 12A subtracts the forward-estimation picture data D17A from the macroblock data D2A to obtain difference data as estimation residue and transmits the difference data to the DCT section 13A as the arithmetic data D3A.

Moreover, the forward-estimation picture data D17A is supplied to the arithmetic circuit 20A from the movement compensating section 22A. The arithmetic circuit 20A locally regenerates the reference picture data D13A (P-picture) by adding the forward-estimation picture data D17A to the arithmetic data D12A and stores the data D13A in the frame memory 21A.

Then, the case is described in which the macroblock data D2A being the B-picture is supplied to the arithmetic circuit 12A from the preprocessing section 11A. In this case, the arithmetic circuit 12A applies any movement compensation processing of the intramode, forward estimation mode, backward estimation mode, and bidirectional estimation mode to the macroblock data D2A.

In the case where the intramode or forward mode is used as the estimation mode, macroblock data S2 undergoes the same processing as the case of the above P-picture. However, because the B-picture is not used as other estimation reference picture, the reference picture data D13A is not stored in the frame memory 21A.

On the other hand, in the case where the backward estimation mode is used as the estimation mode, the arithmetic circuit 12A applies the subtraction processing to the macroblock data D2A by using backward-estimation picture data D16A supplied from the movement compensating section 22A.

The backward-estimation picture data D16A is computed by movement-compensating the reference picture data D13A stored in the frame memory 21A in accordance with the movement vector data D18A. That is, the movement compensating section 22A reads out the reference picture data D13A in the backward estimation mode by shifting the read address of the frame memory 21A in accordance with the movement vector data D18A, and supplies the data D13A to the arithmetic circuits 12A and 20A as the backward-estimation picture data D16A. The arithmetic circuit 12A subtracts the backward-estimation picture data D16A from the macroblock data D2A to obtain difference data as estimation residue and transmits the difference data to the DCT section 13A as the arithmetic data D3A.

Moreover, the backward-estimation picture data D16A is supplied to the arithmetic circuit 20A from the movement compensating section 22A and the arithmetic circuit 20A locally regenerates the reference picture data D13A (B-picture) by adding the backward-estimation picture data D16A to the arithmetic data D12A. However, the reference picture data D13A is not stored in the frame memory 21A because the B-picture is not used as an estimation reference picture.

In the case where the bidirectional mode is used as an estimation mode, the arithmetic circuit 12A subtracts the average value of the forward-estimation picture data D17A and backward-estimation picture data D16A, which are supplied from the movement compensating section 22A, from the macroblock data D2A to obtain difference data as estimation residue and transmits the difference data to the DCT section 13A as the arithmetic data D3A.

Moreover, the forward-estimation picture data D17A and the backward-estimation picture data D16A are supplied to the arithmetic circuit 20A from the movement compensating section 22A and the arithmetic circuit 20A generates the reference picture data D13A (B-picture) by adding the average value of the forward-estimation picture data D17A and the backward-estimation picture data D16A to the arithmetic data D12A. However, the reference picture data D13A is not stored in the frame memory 21A because the B-picture is not used as another estimation reference picture.

Thus, the picture data D1A inputted to the encoder 101A undergoes the movement compensation processing, DCT processing, and quantization processing to be supplied to the VLC section 15A as the quantized DCT coefficient data D5A.

The VLC section 15A applies variable-length encoding processing based on a predetermined transform table to the quantized DCT coefficient data D5A and transmits the resultant data to a buffer section 141A as variable-length encoded data D6A.

The control section 142A always monitors the accumulation state of the variable-length encoded data D6A in the buffer section 141A and obtains the above accumulation state as occupied amount information D23A. Moreover, the control section 142A generates such the amount of data that the buffer section 141A does not overflow or under-flow, in accordance with the amount of data occupying the buffer 141A, by generating the quantization control value D21A in accordance with the occupied amount information D23A, transmitting the value D21A to the quantizing section 14A, and adjusting the quantization step size in the quantization processing.

The buffer section 141A transmits the accumulated variable-length encoded data D6A to a multiplexer 121 (FIG. 2) as an output data stream D8A constituting a PES every picture at a constant rate in accordance with a data transmission control signal. D22A supplied from the control section 142A. In this case, the buffer section 141A of the encoder 101A can keep the rate of the output data stream D8A outputted from the buffer section 141A constant even if the amount of data generated in the quantizing section 14A is extremely reduced and thereby the amount of variable-length encoded data D6A accumulated in the buffer 141A is reduced, because dummy data is added to an optional position of the output data stream D8A at an invalid-data adding section (not illustrated) provided at the output stage of the buffer section 141A in accordance with the amount of encoded data accumulated in the buffer section 141A when the amount of encoded data is extremely small.

Figure 4A:
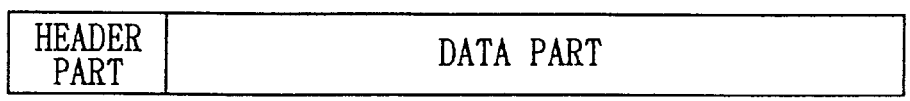
FIGS. 4A and 4B, are schematic diagrams showing structures of a PES packet.

That is, as shown in FIG. 4A, the PES packet constituting the output data stream D8A outputted from the encoder 101A is composed of a header part and a data part, and a packet start code prefix, PES header option, and other various packet control data are stored in the header part and encoded data is stored in the data part.

Figure 4B:
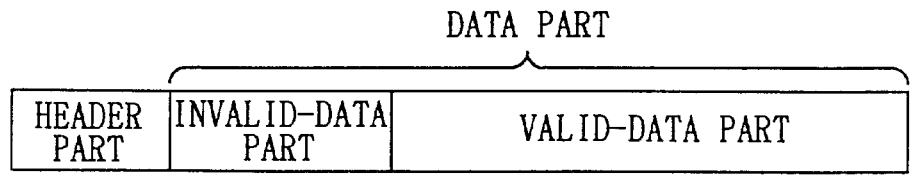

In this case where the pattern of the picture data D1A which is inputted to the encoder 101A is flat and the picture information based on the picture data D1A is extremely small, the encoder 101A forms an invalid data part for dummy data referred to as stuffing-byte data between the header part and the invalid-data part in the data part of the PES packet (after the header part) when forming encoded data into a PES packet every picture and outputting the PES packet from the buffer 141A, as shown in FIG. 4B. In this case, the amount of data is assigned as the dummy data in bytes so as to keep the transmission rate of the output data stream D8A outputted from the encoder 101A at a preset rate.

In this connection, the boundary between the invalid data part, to which dummy data is assigned, and the valid data part, to which encoded picture data (valid data) is assigned, can be detected by the header part of the picture data added to the head of the valid data.

Thus, the output data stream D8A comprising a PES packet string is outputted to the multiplexer 121 from the encoder 101A, keeping the transmission rate constant.

Though the above mention relates to the first encoder 101A, other encoders 101B and 124 also have the same structure.

To multiplex the output data streams D8A and D8B supplied from the respective encoders 101A and 101B, the multiplexer 121 stores and temporarily accumulates a plurality of PES packets included in the output data streams D8A and D8B in their corresponding buffers 103A and 103B in arriving order, and the data accumulated in the buffers 103A and 103B are read out in accordance with the first-in first-out method to be transmitted to an invalid data extracting section 122.

In this case, the buffers 103A and 103B respectively supply the amount of data of the accumulated PES packets to the multiplexing control section 123 as the data accumulation signals S2A and S2B and thereby, the multiplexing control section 123 detects the amount of data which occupy the buffers 103A and 103B in accordance with the respective data accumulation signals S2A and S2B.

The multiplexing control section 123 can read out PES packets from the buffers 103A and 103B in accordance with the first-in first-out method by transmitting the buffer output control signals S3A and S3B to the buffers 103A and 103B respectively in accordance with the above detection result before the buffers 103A and 103B exceed their maximum data accumulation capacity and thus, it is possible to prevent the buffers 103A and 103B from being broken down due to excessive data accumulation.

Then, the invalid data extracting section 122 successively extracts dummy data from the respective PES packets of the output data streams D8A and D8B, which are successively read out from the buffers 103A and 103B, and thereafter, respectively transmits the dummy data to a multiplexing section 127 as valid data streams D8A' and D8B' and counts the number of extracted dummy data and transmits the counted result to the multiplexing control section 123 as an invalid-data-amount-information signal S10.

Specifically, as shown in FIGS. 5A and 5B, in the case where invalid data parts $ND_{A2}$ and $ND_{A4}$ are formed in, for example, respective PES packets $P_{A2}$ and $P_{A4}$ among PES packet strings $P_{A1}, P_{A2}, P_{A3}, P_{A4}, \ldots$ forming the output data stream D8A outputted from the encoder 101A and invalid data parts $ND_{B1}$, $ND_{B2}$, and $ND_{B3}$ are formed in, for example, respective PES packets $P_{B1}$, $P_{B2}$, and $P_{B3}$ among PES packet strings $P_{B1}, P_{B2}, P_{B3}, P_{B4}, \ldots$ forming the output data stream D8B outputted from the encoder 101B, the invalid data extracting section 122 successively detects the header parts $H_{A1}, H_{A2}, H_{A3}$, and $H_{A4}$ and $H_{B1}, H_{B2}, H_{B3}$, and $H_{B4}$ of a coming PES packet string on the respective output data streams D8A and D8B in order to judge whether the data detected after each header part is dummy data. In this case, since dummy data is data not used as valid data (e.g. "00" or "FF"), the invalid data extracting section 122 can easily discriminate the dummy data ($ND_{A2}$ and $ND_{A4}$, and $ND_{B1}$, $ND_{B2}$, and $ND_{B3}$).

Moreover, because the header part of picture data showing the beginning of valid data is assigned to the head of valid data, the invalid data extracting section 122 can discriminate the start of the valid data by detecting the header part of the picture data.

Thus, as shown in FIGS. 5C, 5D, and 5E, the invalid data extracting section 122 does not allow the dummy data $ND_{A2}$, $ND_{A4}$, $ND_{B1}$, $ND_{B2}$, or $ND_{B3}$ in the respective output data streams D8A and D8B composed of PES packet strings to pass but it outputs only valid data and header parts other than the dummy data.

As a result, valid data streams D8A' and D8B' outputted from the invalid data extracting section 122 are constituted using the PES packets $P_{A2}'$ and $P_{A4}'$, and $P_{B1}'$, $P_{B2}'$, and $P_{B3}'$ each of whose data length became short because the dummy data $ND_{A2}$ and $ND_{A4}$, and $ND_{B1}$, $ND_{B2}$, and $ND_{B3}$ are extracted, as shown in FIGS. 5G and 5H.

Moreover, as shown in FIG. 5E, by counting the dummy data $ND_{A2}$ and $ND_{A4}$, and $ND_{B1}$, $ND_{B2}$, and $ND_{B3}$ for a predetermined time whenever extracting the dummy data from the output data streams D8A and D8B, the invalid data extracting section 122 transmits the amount of counted dummy data to the multiplexing control section 123 as the invalid-data-amount-information signal S10 as shown in FIG. 5F. By sequentially counting the amount of dummy data shown by the invalid-data-amount-information signal S10 supplied from the invalid data extracting section 122, the multiplexing control section 123 sequentially detects the total amount of the dummy data extracted from the output data streams D8A and D8B outputted from the encoders 101A and 101B.

Thus, the valid data streams D8A' and D8B' outputted from the invalid data extracting section 122 lose its total amount of data because the dummy data $ND_{A2}$ and $ND_{A4}$, and $ND_{B1}$, $ND_{B2}$, and $ND_{B3}$ are extracted and under the above state, the data streams D8A' and D8B' are outputted to the multiplexing section 127 and recognized using the invalid-data-quantity-information signal S10 by the multiplexing control section 123.

The multiplexing control section 123 transmits a multiplexing control signal S16 to the multiplexing section 127 in accordance with the multiplexing schedule obtained depending on the amount of data which occupy in the buffers 103A and 103B. The multiplexing section 127 generates a transport stream (TS) packet having a fixed data length in accordance with the valid data streams D8A' and D8B' respectively having the PES structure, multiplexes the TS packet in order to generate a multiplexed stream (transport stream) D15, and outputs the multiplexed stream to a transmission system (not illustrated) including a transmission antenna.

In this connection, it is necessary to correct time information for the valid data streams D8A' and D8B' because dummy data are extracted at the invalid data extracting section 122. Therefore, the multiplexing control section 123 adds new time information by transmitting the multiplexing control signal S16 to the multiplexing section 127.

In addition to the above structure, in the transmitter 120, service data D1X such as personal-computer communication data and information service data is supplied to the encoder 124 from a not-illustrated data output section when required. The encoder 124 successively forms the generated encoded data into PES packets in order for each predetermined data unit in accordance with the aforementioned compression-encoding of the MPEG2 method, in order to form and supply an output data stream D8X to a corresponding buffer 125 in the multiplexer 121. In this connection, the service data D1X is data which can be accumulated and is unnecessary to transmit in real time but it can be used according to necessity after being accumulated at the receiving side.

Plural PES packets included in the output data stream D8X are successively stored and accumulated in the buffer 125 in arriving order. In this case, the buffer 125 supplies the amount of data of the accumulated PES packets to the multiplexing control section 123 as a data accumulation signal S12 and thereby, the multiplexing control section 123 can recognize the amount of data accumulated in the buffer 125 based on the data accumulation signal S12.

In this case, the multiplexing control section 123, when a service-data multiplexing request signal S15 is supplied from an external system controller 126, judges whether the amount of the service data D1X accumulated in the buffer 125 is secured up to a minimum amount of data which can be transmitted. When the amount of data is secured, the section 123 transmits a buffer output control signal S13 for designating the amount of data equal to or less than the total amount of dummy data extracted by the invalid data extracting section 122, to the buffer 125 in which the service data D1X is accumulated.

Based on the buffer output control signal S13, the buffer 125 reads out the accumulated PES packets by the amount of data to be used as dummy data in accordance with the first-in first-out method, and transmits the PES packets to the multiplexing section 127 as a service data stream D8X'.

In this case, the multiplexing control section 123 generates a new multiplexing schedule in order to newly multiplex the service data stream D8X' in addition to the valid data streams D8A' and D8B' which are supplied from the invalid data extracting section 122, reads out the output data streams D8A and D8B from the buffers 103A and 103B in accordance with the schedule, in order to control the multiplexing of the multiplexing section 127.

Thus, the multiplexing section 127 generates TS packets having the fixed length in accordance with the valid data streams D8A' and D8B' supplied from the invalid data extracting section 122 and the service data stream D8X' supplied from the buffer 125, multiplexes these TS packets, in order to generate a multiplexed stream (transport stream) D16 including the service data (D1X), and outputs the stream D16 to a transmission system (not illustrated) including a transmission antenna.

Thus, the multiplexed stream D15 or D16 outputted from the multiplexing section 127 is modulated by a modulator of the transmission system (not illustrated) in a predetermined method, and the resultant transmission signal is transmitted toward a broadcasting satellite (not illustrated) through the antenna. In this way, in the transmitter 120, the service data D1X is multiplexed instead of extracted dummy data and is broadcasted in addition to television broadcast programs for plural channels at the same time through the broadcasting satellite.

In this connection, when there is no service data D1X to be transmitted, the multiplexing control section 123 multiplexes an invalid data stream corresponding to the amount of invalid data onto a valid data stream at the multiplexing section 127.

In the case of the above structure, the data streams D8A and D8B outputted as the result of being compression-encoded by the encoders 101A and 101B respectively keep a certain rate by inserting dummy data (stuffing-byte data) between the header part and the valid data part (after the header part) of a PES packet forming the stream D8A or D8B. In this case, the dummy data is inserted so as to be sprinkled in optional PES packets in accordance with the amount of encoded data generated at the encoders 101A and 101B.

The dummy data is extracted by the invalid data extracting section 122 of the multiplexer 121 and the valid data streams D8A' and D8B' are formed by closing the extracted portions. Therefore, the amount of data of the valid data streams D8A' and D8B' is reduced because of extracting the dummy data. The amount of reduced data is sequentially detected by the multiplexing control section 123 and accumulated by a counter whenever dummy data is extracted. Therefore, the dummy data sprinkled in the output data streams D8A and D8B is accumulated as a series of dead data whenever it is extracted by the data extracting section 122.

The situation in which the amount of reduced data (the amount of dead data) reaches to a certain value or more represents the situation in which the service data D1X that can be accumulated and transmitted at any timing can be multiplexed and transmitted to the multiplexed stream 16 every predetermined data unit.

The multiplexing control section 123, receiving the service-data multiplexing request signal S15 from the system controller 126, decides whether the amount of reduced data due to dummy data extraction by the invalid data extracting section 122 reaches to a value for multiplexing the service data D1X by predetermined amount.

Since a negative result represents the situation in which the amount of dummy-data extracted by the invalid data extracting section 122 does not reach to a value capable of assigning the service data D1X, the multiplexing control section 123 waits for the amount of extracted dummy data to reach to a predetermined value.

On the other hand, when the amount of dummy data extracted by the invalid data extracting section 122 reaches to a predetermined value, the multiplexing control section 123 transmits the buffer output control signal S13 to the buffer 125 and thereby, reads out service data streams from the buffer 125 by a value equivalent to the amount of extracted dummy data in predetermined data unit, and supplies the data streams to the multiplexing section 127.

Thus, in the multiplexing section 127, service data is multiplexed by the amount of data extracted by the invalid data extracting section 122, and the whole multiplexed stream D16 is transmitted while keeping a certain rate.

According to the above structure, in the output data streams D8A and D8B respectively outputted from the encoders 101A and 101B, the invalid data extracting section 122, while extracting dummy data (stuffing-byte data) inserted every optional PES packet, counts the amount of extracted dummy data. Thereby, it is possible to multiplex and transmit significant service data instead of unnecessary dummy data and thus, multiplexing efficiency can be improved because the multiplex data D16 does not include dummy data.

(2) Second Embodiment

Figure 6:
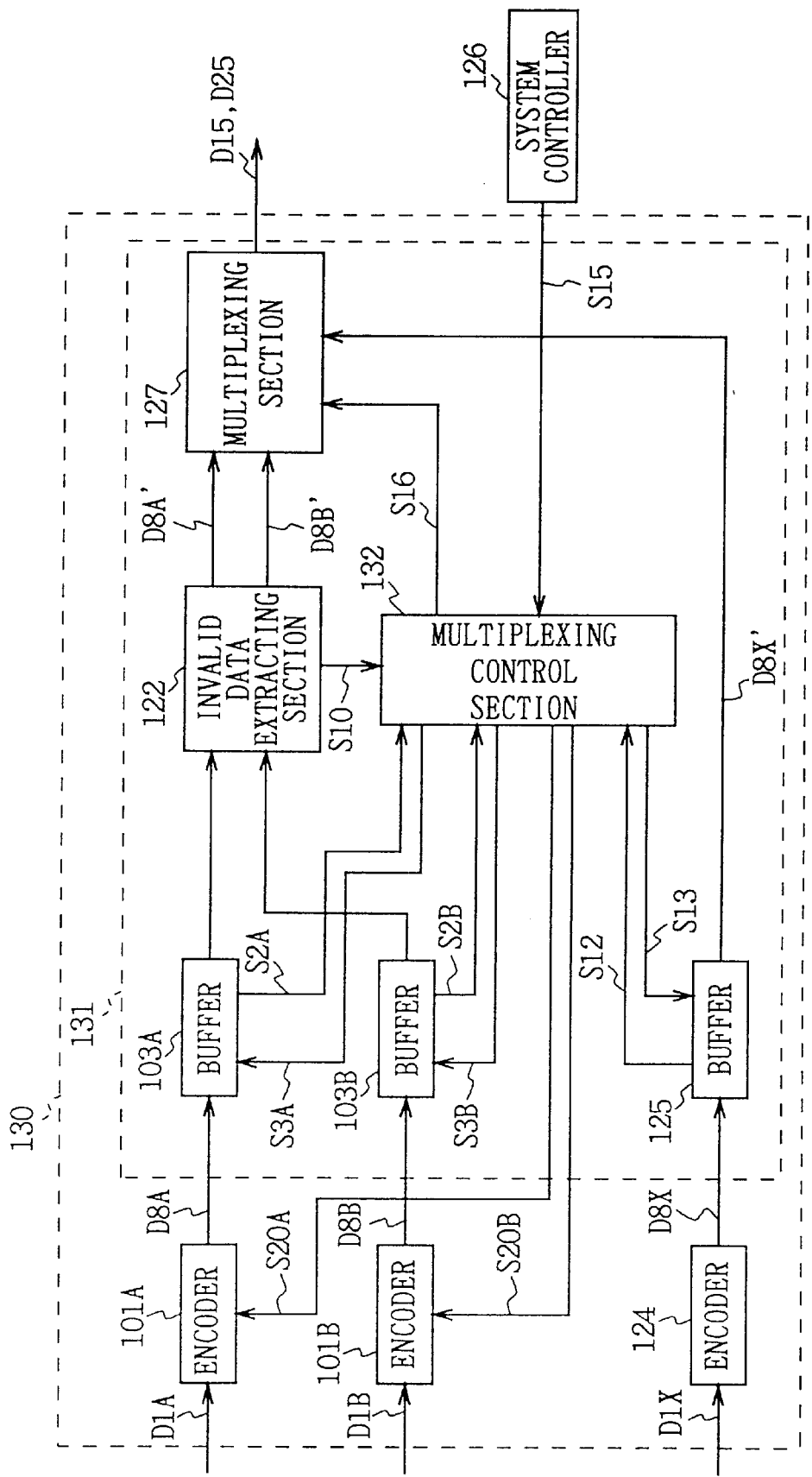
FIG. 6 is a block diagram showing the second embodiment of a multiplexer according to the present invention.

FIG. 6 in which the same reference numerals are applied to parts corresponding to FIG. 2 shows a transmitter 130 used for a digital broadcasting system in a second embodiment. In FIG. 6, a multiplexing control section 132 is constituted so as to be able to control the number of codes generated by the encoders 101A and 101B in addition to the structure and function of the multiplexing control section 123 described in FIG. 2.

In the second embodiment, when the multiplexing request signal S15 is supplied to the multiplexing control section 132 from the external system controller 126, the service data D1X is multiplexed by the amount of extracted dummy data similarly to the aforementioned first embodiment. On the other hand, in the case where the multiplexing request signal S15 is not supplied to the multiplexing control section 132 from the system controller 126 or in the case where the transmission rate of the service data stream D8X is equal to or more than the amount of generated dummy data in spite of the presence of the multiplexing request, the multiplexing control section 132 returns number-of-code control signals S20A and S20B to the encoders 101A and 101B based on the invalid-data-amount information signal S10 obtained from the invalid data extracting section 122.

Figure 7:
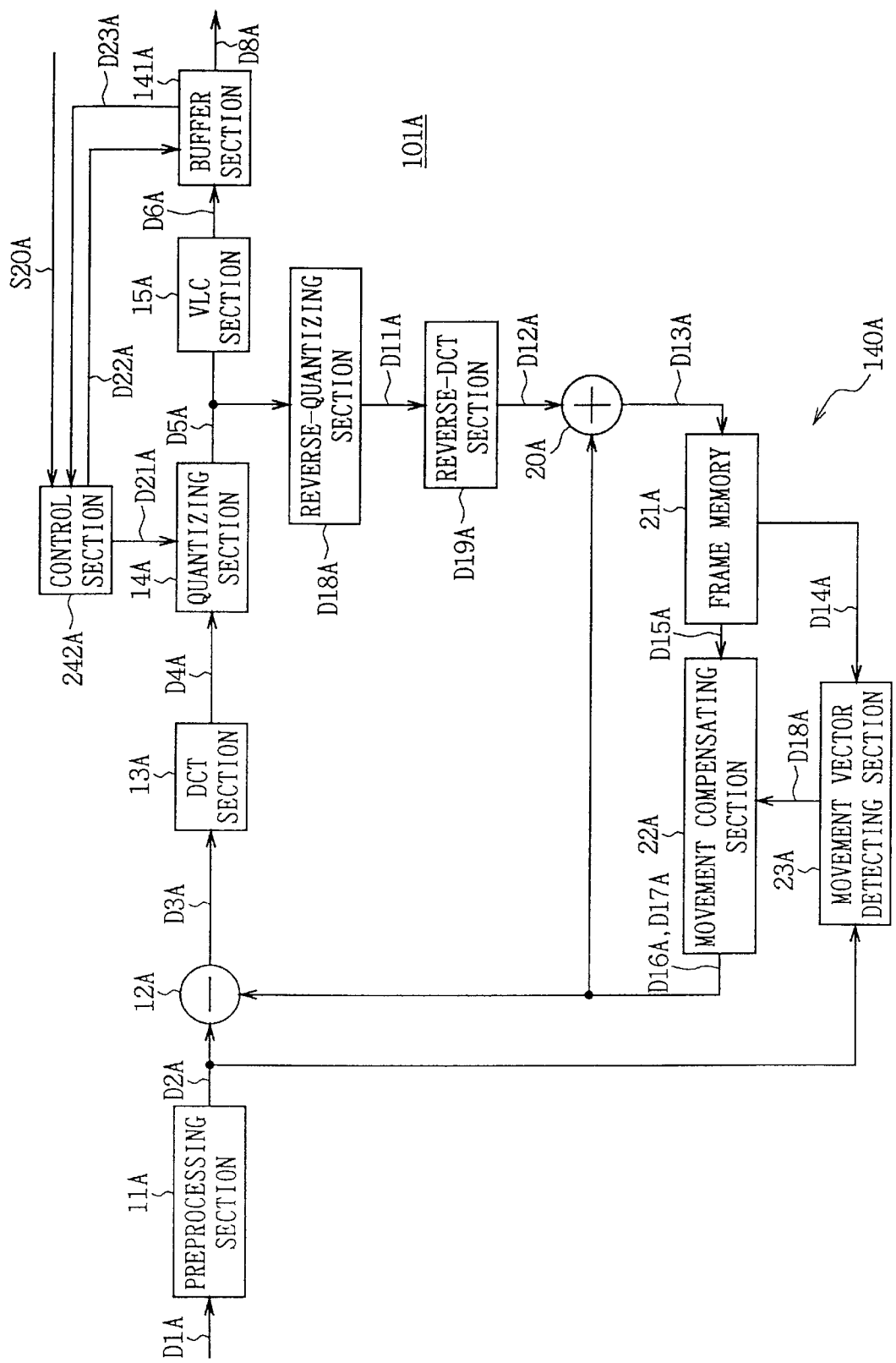
FIG. 7 is a block diagram showing the structure of an encoder in the second embodiment.

FIG. 7 in which the same reference numerals are applied to parts corresponding to FIG. 3 shows the encoder 101A of the second embodiment. In FIG. 7, in addition to the structure and function of the control section 142A described in FIG. 3, a control section 242A is constituted so as to input a number-of-code control signal S20A supplied from a multiplexer 131 and changes quantization step sizes of the quantizing section 14A, in order to control the number of codes to be generated.

Moreover, the encoder 101B also receives the number-of-code control signal S20B from the multiplexing control section 132 and thereby changes quantization step sizes so as to control the number of codes to be generated.

Therefore, in the case where the service data D1X is not multiplexed by the multiplexer 131 (FIG. 6), the multiplexing control section 132 transmits the number-of-code control signals S20A and S20B to the encoders 101A and 100B and thereby, controls the number of codes so that the total number of codes generated by the encoders 101A and 101B becomes equal to the number of codes obtained by adding a value equivalent to dummy data to the number of codes which have been already generated.

However, in the case where the amount of dummy data extracted by the invalid data extracting section 122 is larger than the amount of service data to multiplex the service data D1X by the multiplexer 131 (FIG. 6), the multiplexing control section 132 transmits the number-of-code control signals S20A and S20B to the encoders 101A and 101B and thereby, controls the number of codes so that the total number of codes generated by the encoders 101A and 101B becomes equal to the number of codes obtained by adding the difference between the amount of dummy data and the amount of service data to the number of codes which have been already generated.

Therefore, in the quantizing section 14A (FIG. 7), more codes are generated and the amount of data accumulated in the buffer 141A also increases. As a result, the buffer 141A can output the output data stream D8A having a predetermined rate only by significant data (PES packet string comprising a header part and valid data) without adding dummy data (stuffing-byte data). Moreover, the second encoder 101B can also output the output data stream D8B having a predetermined rate only by significant data similarly to the case of the encoder 101A.

Thus, the above structure makes it possible to further improve transmission efficiency of significant data because a certain rate can be kept without adding dummy data to the output data streams D8A and D8B outputted from the encoders 101A and 101B.

(3) Other Embodiment

Note that, in the aforementioned embodiment, the invalid data extracting section 122 successively extracts invalid data from the PES packets of the output data streams D8A and D8B, which are successively read out from the buffers 103A and 103B, in bytes (that is, every stuffing-byte data). However, the present invention is not limited thereto but when all regions designated by a header of a PES packet is dummy data, all the dummy data including the header can be used as invalid data.

For example, as shown in FIGS. 8A and 8B, in the case where invalid data parts $ND_{A2}$ and $ND_{A4}$ are formed in, for example, the PES packets $P_{A2}$ and $P_{A4}$ of the PES packet string $P_{A1}$, $P_{A2}$, $P_{A3}$, $P_{A4}$, ... forming the output data stream D8A outputted from the encoder 101A and invalid data parts $ND_{B1}$, $ND_{B2}$, and $ND_{B3}$ are formed in, for example, the PES packets $P_{B1}$, $P_{B2}$, and $P_{B3}$ of the PES packet string $P_{B1}$, $P_{B2}$, $P_{B3}$, $P_{B4}$, ... forming the output data stream D8B outputted from the encoder 101B, the invalid data extracting section 122 (FIG. 2 or 6) applies the same dummy-data detection and extraction as the case above described in FIG. 5 to the invalid data parts $ND_{A2}$, $ND_{A4}$, $ND_{B1}$, and $ND_{B2}$ and thereby, extracts only these dummy data (invalid data part).

On the other hand, in the PES packet $P_{B3}$ in which dummy data (invalid data part $D_{B3}$) is assigned to all the regions designated by the PES header, the invalid data extracting section 122 extracts not only the invalid data part $ND_{B3}$, which is constituted with the dummy data, but also the header part $H_{B3}$ of the PES packet as invalid data parts. In this case, in the header part $H_{B3}$, the type of data (normally indicating the type of picture data or the like) assigned to the region (invalid data part $ND_{B3}$ of the PES packet $P_{B3}$) designated by the header part $H_{B3}$ is rewritten by the encoder 101B so as to indicate dummy data (stuffing-byte data) and therefore, the invalid data extracting section 122 can detect that dummy data is assigned to all the regions designated by the header $H_{B3}$ of the PES packet $P_{B3}$ by reading out the header part $H_{B3}$.

Thus, in the case where dummy data is assigned to all the regions designated by the header part $H_{B3}$, it is possible to handle the header part $H_{B3}$ as invalid data. In this case, the invalid data extracting section 122, as shown in FIG. 8F, extracts the header part $H_{B3}$ as invalid data and thereby, transmits the amount of reduced data including the header part $H_{B3}$ to the multiplexing control section 123 (or 132) as the invalid-data-amount information S10. Thus, the multiplexing control section 123 (or 132) recognizes the amount of data including the header part $H_{B3}$ as the amount of invalid data. Thereby, it is possible to further improve multiplexing efficiency, such as the case of raising a rate for multiplexing the service data D1X and the case of increasing the number of codes to be generated by the encoding sections 101A and 101B.

In this connection, FIGS. 8G and 8H show the valid data streams D8A' and D8B' after invalid data is extracted.

Moreover, in the above embodiments, the encoders 101A and 101B and the buffers 103A and 103B are provided correspondingly with two channels so as to multiplex the two output data streams D8A and D8B. However, the present invention is not limited thereto but three or more channels can be used. In this case, encoders and buffers equal to the number of channels can be provided to multiplex output data streams equal to the number of channels similarly to the aforementioned method.

Furthermore, in the above embodiments, the output data streams D8A and D8B outputted from the encoders 101A and 101B are respectively handled as data streams comprising a PES packet string. However, the present invention is not limited thereto but it is also possible to apply the present invention to a case of outputting the data streams in another data unit.

Furthermore, in the aforementioned embodiments, the present invention is applied to the transmitters 120 and 130 of a digital broadcasting system according to the PEG2 method. However, the present invention is not limited thereto but it can be applied to other various transmitters adopting other compression-encoding methods.

Furthermore, in the aforementioned embodiments, the service data D1X for one channel is multiplexed instead of invalid data. However, the present invention is not limited thereto but the service data for two channels or more can be multiplexed. In this case, a plurality of channels comprising an encoder 124X and the buffer 125 is provided.

Furthermore, in the aforementioned embodiments, the quantization step sizes of the encoders 101A and 101B are controlled by the number-of-code control signals S20A and S20B outputted from the multiplexing control section 123 (or 132). However, the present invention is not limited thereto but a data rate to be outputted from the output stage of the buffer section 141A (141B) of the encoders 101A and 101B can be changed.

According to the present invention as described above, multiplexing efficiency of valid data can be improved by detecting and extracting invalid data assigned to an inputted data stream and multiplexing and outputting the data stream from which the invalid data is extracted.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A data multiplexer for multiplexing and outputting a data stream including a plurality of data packets, comprising:

invalid data extracting means for detecting and extracting invalid data assigned to said data packets; and multiplexing means for multiplexing said data packets from which said invalid data is extracted to produce an output data stream;

wherein each of said data packets has a data portion and a header portion, said header portion including information identifying invalid data contained within said data portion; and wherein said invalid data extracting means extracts said invalid data based on the invalid data information in said header portion.

2. The data multiplexer according to claim 1, wherein:

when all of the data contained in said data portion of said data packet is invalid data, said invalid data extracting means extracts both said data portion and said header portion of said data packet.

3. A data multiplexer for multiplexing and outputting a data stream including a plurality of data packets, comprising:

invalid data extracting means for detecting and extracting invalid data assigned to said data packets; and multiplexing means for multiplexing said data packets from which said invalid data is extracted to produce an output data stream;

wherein said data stream includes timing information; and wherein said timing information is regenerated when said invalid data extracting means detects and extracts invalid data from said data stream.

4. A data multiplexer for multiplexing and outputting a data stream including a plurality of data packets, comprising:

invalid data extracting means for detecting and extracting invalid data assigned to said data packets;

multiplexing means for multiplexing said data packets from which said invalid data is extracted to produce an output data stream;

means for detecting an amount of said extracted invalid data; and wherein said multiplexing means multiplexes a predetermined data stream having no invalid data extracted therefrom onto the data stream from which said invalid data is extracted in accordance with the amount of extracted invalid data that has been detected.

5. The data multiplexer according to claim 4, further comprising:

input means for inputting data; and encoding means for encoding said input data to form said predetermined data stream.

6. A data multiplexer for multiplexing and outputting a data stream including a plurality of data packets comprising:

invalid data extracting means for detecting and extracting invalid data assigned to said data packets;

multiplexing means for multiplexing said data packets from which said invalid data is extracted to produce an output data stream;

means for detecting an amount of said extracted invalid data;

means for producing a control signal as a function of the amount of extracted invalid data that has been detected; and a data encoder for encoding valid data in the output data stream as a function of said control signal so that as the amount of invalid data included in said data stream increases, the amount of valid data encoded by said data encoder increases.

7. A data multiplexing method of multiplexing and outputting a data stream including a plurality of data packets, comprising the steps of:

detecting and extracting invalid data assigned to said data packets; and multiplexing said data packets from which said invalid data is extracted to produce an output data stream;

wherein each of said data packets has a data portion and a header portion, said header portion including information identifying invalid data contained within said data portion; and wherein said invalid data is extracted as a function of the invalid data information of said header portion.

8. The data multiplexing method according to claim 7, further comprising the step of:

extracting both said data portion and said header portion of said data packet when all of the data in said data portion of said data packet is invalid data.

9. A data multiplexing method of multiplexing and outputting a data stream including a plurality of data packets, comprising the steps of:

detecting and extracting invalid data assigned to said data packets;

multiplexing said data packets from which said invalid data is extracted to produce an output data stream; and regenerating said time information in said data stream when invalid data is extracted from said data stream;

wherein said data stream includes time information.

10. A data multiplexing method of multiplexing and outputting a data stream including a plurality of data packets, comprising the steps of:

detecting and extracting invalid data assigned to said data packets;

multiplexing said data packets from which said invalid data is extracted to produce an output data stream;

detecting an amount of said extracted invalid data; and multiplexing a predetermined data stream having no invalid data extracted therefrom onto the data stream from which said invalid data is extracted in accordance with the amount of extracted invalid data that has been detected.

11. The data multiplexing method according to claim 10, further comprising the steps of:

inputting supplied data; and encoding said inputted data to form said predetermined data stream.

12. A data multiplexing method of multiplexing and outputting a data stream including a plurality of data packets, comprising the steps of:

detecting and extracting invalid data assigned to said data packets;

multiplexing said data packets from which said invalid data is extracted to produce an output data stream;

detecting an amount of said extracted invalid data;

producing a control signal as a function of the amount of extracted invalid data that has been detected; and encoding valid data in the output data stream as a function of said control signal so that as the amount of invalid data included in said data stream increases, the amount of encoded valid data increases.

* * * * *